US007814488B1

(12) United States Patent
Dice et al.

(10) Patent No.: US 7,814,488 B1
(45) Date of Patent: Oct. 12, 2010

(54) QUICKLY REACQUIRABLE LOCKS

(75) Inventors: David Dice, Foxboro, MA (US); Mark S. Moir, Somerville, MA (US); William N. Scherer, III, Rochester, NY (US)

(73) Assignee: Oracle America, Inc., Redwood City, CA (US)

( * ) Notice: Subject to any disclaimer, the term of this patent is extended or adjusted under 35 U.S.C. 154(b) by 1956 days.

(21) Appl. No.: 10/669,948

(22) Filed: Sep. 24, 2003

Related U.S. Application Data (60) Provisional application No. 60/413,112, filed on Sep. 24, 2002.

(51) Int. Cl.
G06F 9/46 (2006.01)
G06F 17/00 (2006.01)
G06F 13/00 (2006.01)

(52) U.S. Cl. .................. 718/103; 707/704; 711/155
(58) Field of Classification Search ............ 707/8, 707/704; 718/102, 103; 711/154, 155
See application file for complete search history.

(56) References Cited

U.S. PATENT DOCUMENTS

| | | | |
|---|---|---|---|
| 3,886,525 A | | 5/1975 | Brown et al. |
| 4,584,640 A | | 4/1986 | MacGregor et al. |
| 4,847,754 A | | 7/1989 | Obermarck et al. |
| 5,224,215 A | | 6/1993 | Disbrow |
| 5,860,126 A | * | 1/1999 | Mittal ......................... 711/167 |
| 6,038,646 A | * | 3/2000 | Sproull ....................... 711/158 |
| 6,081,665 A | * | 6/2000 | Nilsen et al. ................ 717/116 |
| 6,112,222 A | * | 8/2000 | Govindaraju et al. ....... 718/102 |
| 6,128,710 A | | 10/2000 | Greenspan et al. |

(Continued)

FOREIGN PATENT DOCUMENTS

EP 0 366 585 5/1990

(Continued)

OTHER PUBLICATIONS

Massalin, H., et al., "A Lock-Free Multiprocessor OS Kernel," Technical Report TR CUCS-005-9, Columbia University, New York, NY, 1991, 21 pages.

(Continued)

*Primary Examiner*—Hyung S Sough
*Assistant Examiner*—Charles E Anya
(74) *Attorney, Agent, or Firm*—Robert C Kowert; Meyertons, Hood, Kivlin, Kowert & Goetzel, P.C.

(57) ABSTRACT

Techniques are provided for quickly reacquiring mutual exclusion locks (QRLs), such as in the case in which a single process repeatedly acquires and releases the lock and in which no other process attempts to acquire the same lock. When the first holder of a QRL first acquires the lock, it biases the lock to itself. Bias may be directed in different way or at different times in some realizations. Biasing may involve a one-time compare-and-swap instruction. Thereafter, this bias-holder can reacquire and release the lock free of atomic read-modify-write operations. If a second process attempts to acquire a QRL, then the lock may revert to a "default lock". Any standard mutual exclusion lock may be used as the default lock. A QRL lock may be reinitialized so that it can be rebiased. Rebiasing may be valuable in the case of migratory data access patterns.

52 Claims, 3 Drawing Sheets

U.S. PATENT DOCUMENTS

| | | | |
|---|---|---|---|
| 6,144,965 | A | 11/2000 | Oliver |
| 6,178,423 | B1 | 1/2001 | Douceur et al. |
| 6,360,219 | B1 | 3/2002 | Bretl et al. |
| 6,360,220 | B1 | 3/2002 | Forin |
| 6,366,932 | B1 | 4/2002 | Christenson |
| 6,430,649 | B1 * | 8/2002 | Chaudhry et al. ............ 711/100 |
| 6,581,063 | B1 | 6/2003 | Kirkman |
| 6,651,146 | B1 | 11/2003 | Srinivas et al. |
| 6,662,364 | B1 * | 12/2003 | Burrows et al. ............. 718/102 |
| 6,678,807 | B2 * | 1/2004 | Boatright et al. ............ 711/154 |
| 6,757,891 | B1 * | 6/2004 | Azagury et al. ............. 717/158 |
| 6,772,153 | B1 * | 8/2004 | Bacon et al. .................... 707/8 |
| 6,792,601 | B1 * | 9/2004 | Dimpsey et al. ............ 718/102 |
| 6,826,757 | B2 | 11/2004 | Steele, Jr. et al. |
| 6,965,961 | B1 * | 11/2005 | Scott .......................... 710/310 |
| 7,398,376 | B2 * | 7/2008 | McKenney .................. 712/225 |
| 2001/0014905 | A1 * | 8/2001 | Onodera ...................... 709/102 |
| 2001/0047361 | A1 | 11/2001 | Martin et al. |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2003/0182465 | A1 | 9/2003 | Moir et al. |
| 2004/0015510 | A1 | 1/2004 | Moir et al. |
| 2004/0015642 | A1 | 1/2004 | Moir et al. |
| 2004/0034673 | A1 | 2/2004 | Moir et al. |
| 2004/0153687 | A1 | 8/2004 | Moir et al. |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations for Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology For Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling For Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots in O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99/1624, Palo Alto, CA, Aug. 1999, 241 pages.

Agesen, Ole, et al.: "DCAS-Based Concurrent Deques," *SPAA 2000. Proceedings of the 12th Annual ACM Symposium on Parallel Algorithms and Architectures*, pp. 137 146, ACM Press, New York, NY, ISBN: 1-58113-185-2, 2000.

Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

Anderson, James H. et al., "Universal Constructions for Large Objects," *IEEE Transactions on Parallel and Distributed Systems*, vol. 10, No. 12, pp. 1317-1332, 1999.

Dice, David et al., "Mostly Lock-Free Malloc," *Proceedings of the 3rd International Symposium on Memory Management*, pp. 163-174, ACM Press, New York, NY, 2002.

Dijkstra, E., "Solution to a Problem in Concurrent Programming Control," Communications of the ACM, vol. 8, No. 9, p. 569, 1965.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Moir, Mark, "Practical implementation of non-blocking synchronization primitives," *Proceedings of the Sixteenth Annual ACM Symposium on Principles of Distributed Computing*, pp. 219-228, ACM Press, New York, NY, 1997.

Agesen, Ole at el., "An Efficient Meta-Lock for Implementing Ubiquitous Synchronization", ACM SIGPLAN Notices, vol. 34, No. 10, pp. 207-222, 1999.

Bacon, David F. et al., "Thin Locks: Featherweight Synchronization for Java", ACM SIGPLAN Notices, vol. 33, No. 6, pp. 258-268, 1998.

Dice, David, "Implementing Fast Java™ Monitors with Relaxed Locks", In Proceedings of the USENIX JVM'01 Conference, 2001.

Lamport, Leslie, "A Fast Mutual Exclusion Algorithm", ACM Transactions on Computer Systems, vol. 5, No. 1, pp. 1-11, 1987.

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

* cited by examiner

QUICKLY REACQUIRABLE LOCKS

CROSS-REFERENCE TO RELATED APPLICATION(S)

This application claims priority, under 35 U.S.C. §119(e), of U.S. Provisional Application No. 60/413,112, filed 24 Sep. 2002, naming David Dice, Mark S. Moir and William N. Scherer as inventors.

BACKGROUND

1. Field of the Invention

The present invention relates generally to coordination amongst execution sequences in a multiprocessor computer, and more particularly, to techniques for facilitating efficient implementations of mutual exclusion mechanisms.

2. Description of the Related Art

The mutual exclusion problem has a long history. Beginning with Dijkstra's publication of Dekker's first correct mutual exclusion lock in 1965 (E. Dijkstra, *Solution to a Problem in Concurrent Programming Control*, Communications of the ACM, 8(9):569 (1965)), and continuing through to the present time, mutual exclusion locks have been the focus of hundreds if not thousands of research papers and other technical writings. Because the problem is so pervasive, it ranks among the most well-known in all of computer science.

As formally specified, the mutual exclusion problem arises in a domain wherein each participating process executes, in strict cyclic order, program regions labeled remainder, acquire, critical section, and release. A solution to the mutual exclusion problem then can be defined in the form of code for the acquire( ) and release( ) operations. These operations guarantee that once a process successfully completes an acquire( ) operation, no other process will complete an acquire( ) operation before the first process invokes a release( ) operation. Solutions to the mutual exclusion problem are often referred to as locks.

An important advance in the study of lock performance is due to Lamport. See L. Lamport, *A Fast Mutual Exclusion Algorithm*, ACM Transactions on Computer Systems, 5(1):1-11 (1987). In Lamport's fast mutual exclusion algorithm, a fast path guarantees that the lock and unlock operations complete in time independent of the number of potential contending processes in the important case where a single process contends for the lock in isolation. Locks that share this property are called fast locks, and most important locks used in production software are fast locks. While Lamport's algorithm was the first to use only load and store operations in a fast path, it depends on sequential consistency and therefore its advantages do not extend to modern shared memory architectures that support weaker memory models.

Within the category of fast locks, we have focused on identifying particularly important sub-cases as well as on how to optimize for them. One such sub-case that we believe to be particularly important in multithreaded computing systems, such as those that build-upon JAVA™ technology or .NET common language runtime (CLR) technology, is the case where a single process (or thread) repeatedly acquires and releases a lock, but other processes (or threads) rarely, if ever, access that lock. Such cases typically arise in actual program execution sequences because historically, the overhead of locking has been such that system designers have gone to great lengths (in the design of data structures and algorithms) to avoid synchronization overheads wherever possible. In such designs, locks are acquired by a dominant process primarily to provide safety in the case where another process needs to share access to the data; however, these cases are very rare by design. Java and all Java-based marks and logos are trademarks or registered trademarks of Sun Microsystems, Inc. in the United States and other countries.

Another important sub-case relates to adaptivity to variations in execution environments, particularly as programmers seek to achieve platform-independent synchronization of concurrent processes (and/or threads). Such goals encourage the use of structures and techniques that map well to a variety of execution environments, including both single-threaded and multi-threaded execution environments.

What is needed are mutual exclusion techniques whose performance is enhanced or optimized for actual program execution sequences in which a dominant process (or thread) repeatedly acquires and releases a lock, but other processes (or threads) rarely, if ever, access the lock. What is also needed are mutual exclusion techniques that impose limited or minimal overhead when included in program code that, during a particular execution thereof, executes as a single-threaded computation or in an execution environment where hazards of concurrent execution are otherwise obviated.

SUMMARY

We have developed a class of mutual exclusion techniques that address some or all of the aforementioned needs. In the description that follows, we call locks that implement or exploit our techniques quickly reacquirable locks (QRLs). We also refer to an optimized code path in which a process (or thread) reacquires and subsequently releases a lock that it has previously held, and that no other process has ever held, as an ultra fast path, to distinguish from others' use of terminology, such as fast path, to describe other features. Such terms are employed purely as a useful shorthand and for clarity of description of some embodiments in accordance with the present invention. The full scope of the invention(s) will be understood with reference to the claims that follow.

In some embodiments of the present invention, our techniques are employed in the implementation of a lock that is biasable to a particular thread of a computation. Typically, such a biasable lock is instantiated without correspondence to any particular thread and is later biased to a thread, thereafter known as the bias-holding thread. Typically, biasing is performed coincident with a first acquisition of the biasable lock, though in some exploitations, bias may be directed to a particular thread on instantiation of a related object or coincident with some other pre-acquisition event. For example, bias may be directed to a thread that instantiates a related object or to a thread on behalf of which an object factory (or design pattern technique) prepares an object, class, method or data structure.

A bias-holding thread enjoys a preferential relation, as compared to a non-bias-holding thread (if any), with respect to the lock. In particular, as employed in some embodiments in accordance with the present invention, acquisition and release sequences are free of atomic read-modify-write operations when executed by the bias-holding thread. Accordingly, acquisition and release can be highly optimized for the bias-holding thread. In some realizations, acquisition and release may employ only read and write memory access operations.

As a result, in an actual program execution sequence in which a particular thread to which bias has been directed repeatedly acquires and releases a lock, but in which other threads rarely, if ever, access the lock, acquisition and release by the bias-holding thread is optimized. As a related benefit, program code prepared for execution in both multi-threaded and single-threaded environments, but which during a particular execution thereof, executes as a single-threaded computation or such that relevant hazards of concurrent execution are otherwise obviated, executes largely unencumbered by overheads associated with locking support. Yet, despite the avoidance of locking overheads, the program code is suitable, without alteration, for multithreaded execution (e.g., in another execution environment or in the same execution environment, if and when additional resources are available or are allocated to the computation).

In some embodiments, a lock is biasable once and reverts to a neutral, unbiased state if a thread other than the bias-holding thread acquires or seeks to acquire the lock. In some embodiments, a lock is rebiasable. Such embodiments may be particularly well suited for computations that exhibit migratory access patterns. For example, in some exploitations, one thread might be the sole accessor of an object during a certain phase of computation. Specifically, the thread might lock and unlock the object repeatedly during this phase but because of the design of the algorithm, contention (from another thread attempting to acquire the lock while our first thread holds the lock) occurs either not at all or infrequently. The first thread may then pass the object to a second thread for a next phase of processing, and the second thread will then become the sole or dominant accessor of the object.

In some embodiments, a memory barrier (e.g., a membar instruction or the like) is employed to preclude reordering of particular operations. In some embodiments, a signal handler or cross-call is employed. In some embodiments, a collocation technique is employed, that, in at least some memory model implementations, ensures that, despite a general reordering of operations undertaken by a compiler or processor logic, a particular store will always precede a particular load that follows the store in program order.

These and other embodiments will be understood with reference to the description and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

Exploitations of techniques of the present invention are many. In particular, a wide variety of mutual exclusion mechanisms are contemplated and embodiments of the present invention include such mechanisms encapsulated in callable form as a lock (e.g., in accordance with an application programming interface (API) that defines acquire( ) and release( ) interfaces, or the like) or otherwise as sequences of operations that, though not encapsulated in callable form, may be introduced or included (e.g., in-line) in program code to provide lock or lock-like mutual exclusion. Without loss of generality, terminology and techniques consistent with certain widely-understood locking constructs, e.g., MCS locks and TATAS locks, are used to provided a clear descriptive context for our techniques. Nonetheless, the invention is not limited thereto. Indeed, other contexts are described and, based on the description herein, persons of ordinary skill in the art will appreciate other realizations of mutual exclusion for specific implementations.

In addition, while terminology is used herein consistent with certain multithreaded software techniques, multiprocessor architectures and computational environments provide a useful descriptive context, exploitations of the present invention are not limited thereto. For example, while much of the description herein assumes compare-and-swap (CAS) based synchronization, other primitives and constructs may also be employed. Indeed, it is well established that load-linked (LL) and store-conditional (SC) operation pairs can be employed in place of CAS operations. Alternatively, swap operations may be employed in some implementations. Accordingly, the CAS-based implementations described herein will be understood as exemplary, and other synchronization constructs may be employed consistent with facilities supported by a given processor, system or execution environment. Further, techniques of the present invention are generally applicable to software that may be executed in computational environments that do not provide opportunities for concurrent execution at all (as long as some possible execution environment so provides) or in computational environments that, at a given time or for given loads or data sets, do not provide or allocate resources to concurrent execution. Finally, the term thread is used herein in a general sense to encompass various units of potential concurrent execution, be they threads, processes or the like, i.e., without regard to any machine- or execution-environment-specific terminology in which distinctions amongst such terms are made.

Accordingly, in view of the above and without limitation, exemplary CAS-based implementations of quickly reacquirable locks are now described in the context of multithreaded computations.

Quickly Reacquirable Locks

Having identified quickly reacquirable locks (QRLs) as a sub-case of interest, we now proceed to develop techniques for implementing them. In order to do this, however, we must first decide upon what constitutes an optimized reacquirable lock. Generally speaking, QRLs are optimized by reducing the overhead and number of instructions that appear in the ultra fast path. In particular, we focus on the use of atomic read-modify-write instructions in the ultra fast path, because these instructions are typically much more expensive than other instructions.

Below, we describe several atomic read-modify-write instructions that are commonly used in locks, and that we wish to avoid in the ultra fast path of QRLs. In the remainder of the description, we will adopt the industry convention of referring to these particular instructions as atomic instructions.

The first instruction, compare-and-swap (hereafter, CAS), atomically checks to see whether the value in the memory location referenced by a pointer is some given value and if so, replaces it with another given value. Pseudocode for the CAS instruction is as follows:

```
Boolean CAS(int *ptr, int old, int new) {
    atomically {
        if (*ptr==old) {
            *ptr=new;
            return true;
        } else {
            return false;
        }
    }
}
```

Another common instruction, SWAP, atomically substitutes a value for the contents of the memory location referenced by a pointer and returns the old contents of that location. Pseudocode follows:

```
int SWAP(int *ptr, int new) {
    atomically {
        int result=*ptr;
        *ptr=new;
        return result;
    }
}
```

Other atomic instructions that we would like to avoid in the ultra fast path include load-linked/store-conditional (LL/SC) operation pairs, transactional memory operations, etc.

One final type of instruction bears mention. The memory barrier (hereafter, membar) constrains the processor from performing certain types of memory access reorderings. In particular, membars are typically used in processors that conform to the Total Store Order (TSO) memory model to prevent read operations from being reordered before write operations. These membar instructions can be expensive because their implementation typically drains a processor's store buffer, thereby introducing latency in the executing program. In practice, on modern, highly-pipelined CPUs, a membar operation can be as expensive as an atomic instruction such as a CAS. For this reason, we wish to avoid membar instructions in the ultra fast paths of QRLs, when possible. At least some QRL implementations described herein avoid both membar operations and atomic read-modify-write operations in the ultra fast path code.

Applications to Conventional Lock Techniques

Most existing well-known locks contain atomic instructions in both acquire( ) and release( ) operations. The MCS lock is a typical example in that, even absent contention, it uses a SWAP instruction in the acquire path and a CAS in the release path. For a description of MCS locks, see J. Mellor-Crummey and M. Scott, *Algorithms for Scalable Synchronization on Shared-Memory Multiprocessors*, ACM Transactions on Computer Systems, 9(1):21-65 (1991). Another well-known lock, TATAS (the so-called test and test and set lock) uses a test-and-set or compare-and-swap atomic instruction to acquire the lock, though releasing the lock involves a simple write. Other conventional locks include those optimized specifically for use inside Java Virtual Machines including:

Metalocks (CAS in both acquire and release) (see Ole Agesen, David Detlefs, Alex Garthwaite, Ross Knippel, Y. S. Ramakrishna and Derek White, *An Efficient Metalock for Implementing Ubiquitous Synchronization*, ACM SIGPLAN Notices, 34(10):207-222 (1999)), Thin locks (CAS in acquire) (see David F. Bacon, Ravi B. Konuru, Chet Murthy, and Mauricio J. Serrano, Thin Locks: Featherweight Synchronization for Java, In SIGPLAN Conference on Programming Language Design and Implementation, pp. 258-268 (1998)); and Relaxed-locks (CAS in acquire) (See D. Dice, *Implementing Fast Java™ Monitors with Relaxed-locks*, In Proceedings of the USENIX JVM'01 Conference (2001)).

For QRL variants of the preceding examples, our target is to define ultra fast paths for acquire and release portions and to avoid all such read-modify-write instructions in the ultra fast code path. In the description that follows, we give specific examples of QRL variants of MCS and TATAS locks. Based on that and other description herein, persons of ordinary skill in the art will appreciate suitable adaptations for other lock types and designs.

Construction of Atomic-Free QRLs

We first present an overview and detailed description of a particular QRL embodiment. Later, we discuss several potential design alternatives. This latter set is not meant to be an exclusive list of all possible QRL implementations; rather, it provides an indication of the wide applicability of this idea.

Generic QRL Implementation

Our atomic-free QRLs typically add two additional fields to some default lock (which can be any standard lock). The first field is a status word that takes on one of the values: {NEUTRAL, BIASED, REVOKED, DEFAULT}. Typically, the lock is initially NEUTRAL and the first time the lock is acquired, the process acquiring the lock changes the status to BIASED. In some variations, bias may be directed to a process independent of acquisition, e.g., on creation or initialization by a particular process, on object creation by, or on behalf of, a particular process, etc. In any case, if a second process attempts to acquire the lock, it eventually changes the lock status to DEFAULT, but may set the status to REVOKING as an intermediary state in the revocation protocol. When the lock state is BIASED, the first field additionally contains a process identifier for the current bias owner. In a non-rebiasable QRL, the state can only move forward, in order, through these values. We later discuss QRLs that can be rebiased.

The second field is a Boolean bit that indicates whether the bias holder currently holds the lock. Hence, when the lock has been acquired, and not subsequently revoked, the bias holder can acquire or release the lock by simply toggling this bit using ordinary (i.e., non-atomic) memory access operations. We adopt the notation that a process that has set this bit has acquired the QRL via the quicklock. A process can acquire the QRL via either the quicklock or via the default lock; our constructions ensure that both "sub-locks" cannot be concurrently held.

Switching a lock from NEUTRAL to being biased to a particular process can be done for the one-time cost of a single CAS operation. The CAS (or some equivalent mechanism) is used in order to prevent a race condition in which multiple processes simultaneously attempt to acquire a previously NEUTRAL lock.

The main difficulty in constructing a QRL that does not include atomic instructions in its ultra fast path lies in coordinating the revocation of a lock between a revoking process and the bias holder process (that might be anywhere in the acquire-release cycle). Race conditions that must typically be addressed include a revocation that occurs simultaneous to a biased acquire as well as a revocation that occurs simultaneous to a biased release. Yet another race condition occurs when multiple processes attempt to revoke the lock simultaneously; however, this last race can be avoided by using CAS to change the lock status word to the intermediate REVOKING state: the process for which the CAS succeeds is the "true revoker" and any other processes revert to acquiring the default lock.

Figure 1:
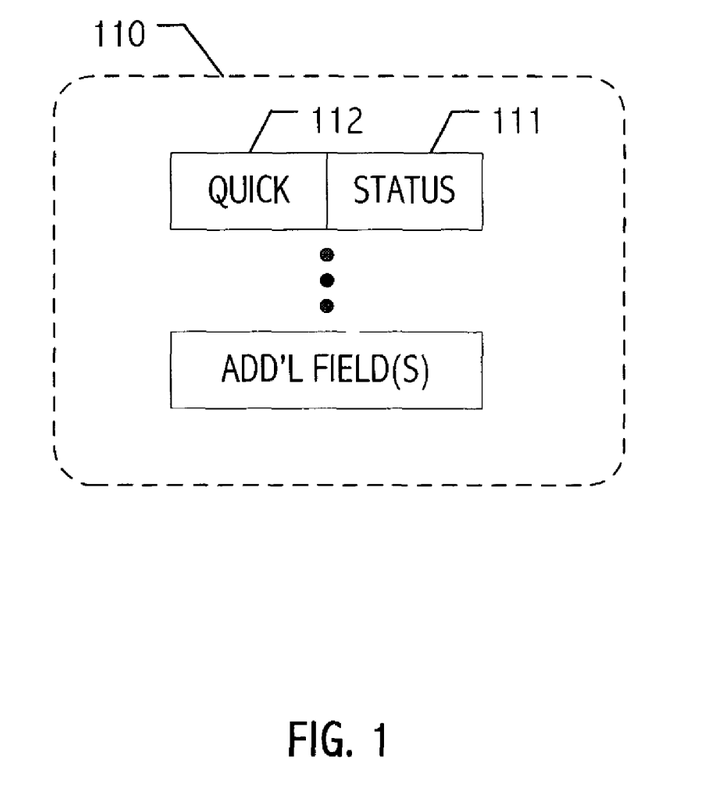
FIG. 1 depicts a lock representation corresponding to some QRL implementations in accordance with the present invention.

FIG. 1 depicts a lock representation corresponding to some QRL implementations. In the illustrated embodiment, a quicklock field 112 and a status field 111 are represented in a location that may be updated using a single-location synchronization construct such as a compare-and-swap (CAS) operation. The status field encodes status of the QRL (e.g., NEUTRAL, BIASED, REVOKING, DEFAULT). If status==BIASED, the quicklock field stores an indication of whether the QRL is owned (i.e., has been acquired) by the bias-holding thread. In some realizations, the status BIASED corresponds to a range of states that identify the bias-holding thread. In some realizations, collocation of the quicklock field and the status field in a location (e.g., a double word) that can be read by a single load operation (but for which the quicklock field can be separately written by a store operation) serves as a basis for coordinating potentially concurrent access without use of a memory barrier. As a general matter, we presume some basic underlying default lock which is augmented by the techniques described herein. Additional fields 113 represent whatever lock state is desirable for support of the underlying default lock.

Figure 2:
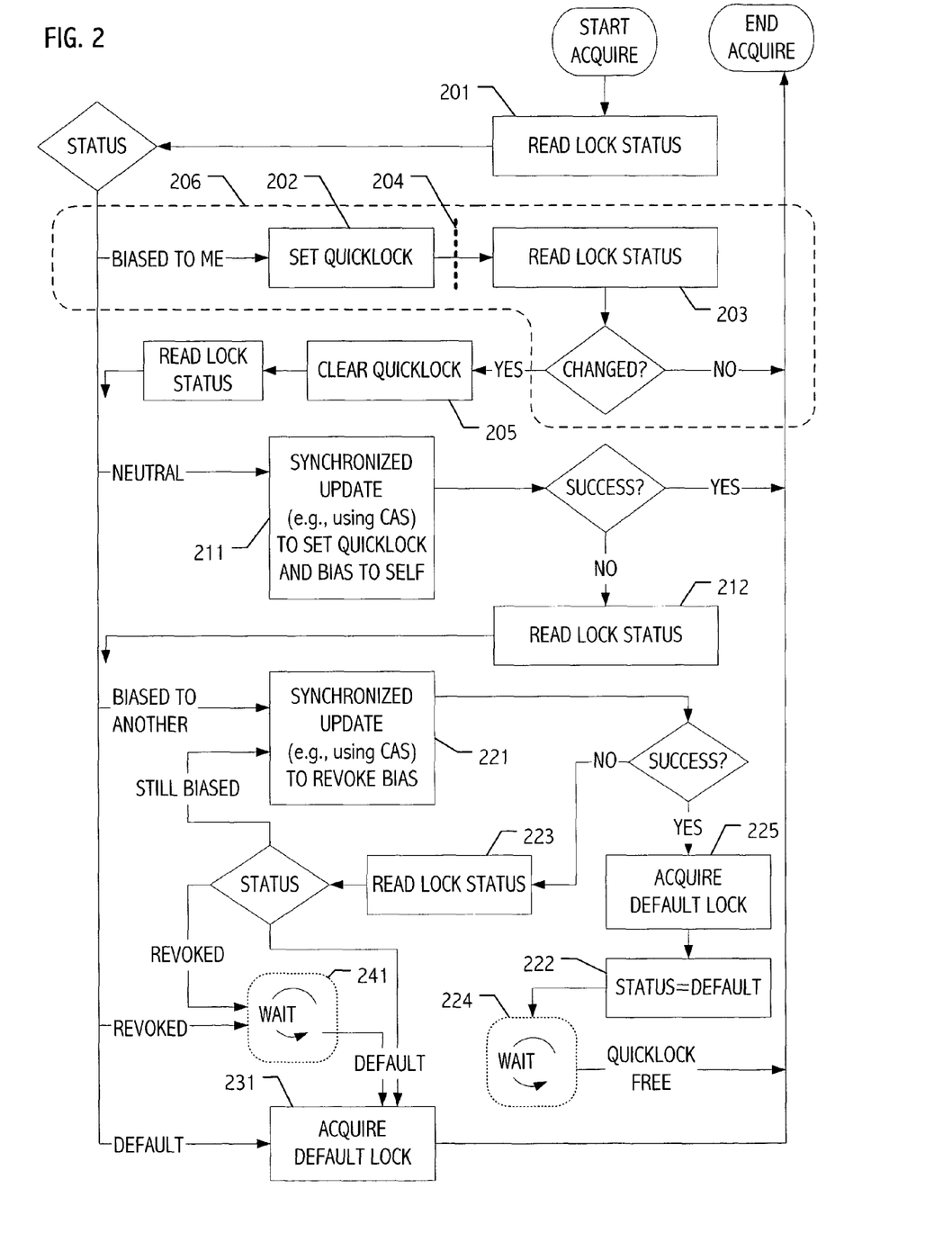
FIG. 2 depicts an acquire flow for a quickly reacquirable lock in accordance with some embodiments of the present invention.

FIG. 2 depicts an acquire flow for a quickly reacquirable lock (QRL) in accordance with some embodiments of the present invention. A thread that wishes to acquire the QRL reads (201) the status field. If the acquiring thread is the bias-holding thread, we set (202), using an ordinary store, the quicklock field and check (203), using an ordinary load, the status field. If the status field indicates that the QRL remains biased to the acquiring thread, acquisition is complete. If the status field indicates that the QRL is no longer biased to the acquiring thread, we clear (205) the quicklock field and continue based on the new status. Note that, if the acquiring thread is the bias-holding thread (and no other thread causes bias to be revoked), the acquisition completes via an ultra fast path 206 that does not require any read-modify-write synchronization.

In some realizations, proper operation of ultra fast path 206 is assured by a facility 204 that ensures that store 202 is performed before load 203, irrespective of any operation reordering ordinarily undertaken by a compiler or at runtime. In some realizations, facility 204 includes a membar instruction interposed between store 202 and load 203. In some realizations, a collocation technique is employed to ensure proper order of execution. Potentially competing revocations of bias (see below) perform an atomic read-modify-write operation on contents of a location that spans the quicklock and status fields. The main point of ensuring that the load (line 7) is ordered after the store (line 6) is to ensure that, in a race between a bias-holding thread reacquiring the lock and a revoker revoking it, one of them detects the presence of the other, so we can avoid the possibility that both go into the critical section.

In other realizations, described elsewhere herein, a signal-based technique is employed whereby revocation of bias is accomplished via Unix-like signals. If the revocation signal is delivered while the revokee (the thread toward which the bias is directed) is executing on a processor, the signal will be implemented as a precise interrupt forcing the processor on which the revokee is executing to serialize execution. Serialization prevents reordering of instructions and memory accesses that occur before and after recognition of the signal. The signal handler checks to see if the interrupted thread was executing within either the acquire or release ultra-fast-path code sections. The code in the acquire ultra-fast-path reads the bias field, and if the bias field indicates the lock is unlocked but biased toward the current thread, it stores a value into the bias field indicating that the lock is now locked and biased toward the current thread. Likewise the release ultra-fast-path will load the bias field and, if the lock is locked and biased toward the current thread, the code will perform a store into the bias field of a value that indicates the lock is unlocked, but remains biased toward the current thread. In both cases, acquire and release, a successful ultra-fast-path operation will load the bias field, examine the value, generate an updated value, and then store that value into the bias field. These read-modify-write sequences in the ultra-fast-paths are accomplished with load and store operations absent any atomic operations or memory barrier operations. If the signal handler interrupts an ultra-fast-path operation before the store, the signal handler will modify the flow of control such that control restarts at the beginning of the ultra-fast-path when the signal handler finishes and returns. Note that, while the signal handler executes, execution of the code that the revokee was originally executing (at the time of the signal), potentially including ultra-fast-path operations, is deferred. In this fashion, revocation occurs safely and without any chance of interference from concurrent ultra-fast-path operations taken by the revokee.

In still other realizations, a garbage collection safe point technique is employed in a manner similar to the signal. As a result, the concurrent execution of ultra fast path 206 completes consistent updates of the bias field without use (in the ultra fast path) of atomic read-modify-write instructions or memory barriers. A revoking thread can request that the thread toward which bias is directed will stop and rendezvous at a so-called safe point. Note that in the case of a garbage collection safe point realization it is unlikely that safe points would be defined within the code making up the ultra fast path.

Turning to the other statuses, an acquiring thread attempts to bias a NEUTRAL QRL to itself. In particular, the acquiring thread employs (211) an atomic read-modify-write operation (e.g., a CAS) to bias the lock and set the quicklock field. If the CAS is successful, acquisition is complete. Failure of the CAS indicates that another thread is now the bias-holding thread. We re-read (212) and, if that thread is still holding the bias, we attempt to revoke its bias.

If the acquiring thread determines that the QRL is biased to another thread (either initially or after a failure to acquire bias), we attempt to revoke (221) using an atomic read-modify-write operation (e.g., a CAS) to change status to a REVOKED status. If successful, we initialize (if necessary) and acquire (225) the default lock. Since this acquisition is uncontended, acquisition can be performed without atomic operations, if desirable, or via the default lock's normal acquisition sequence. Next, we change (222) status to DEFAULT, wait (224) for the thread to which the quicklock was previously biased to release, and return. If the CAS is unsuccessful, we re-read (223) lock status. If status remains BIASED, we retry. If status is REVOKED, we wait (241) for the revoking thread (some other thread) to complete its revocation, changing status to DEFAULT. If status is, or once status becomes, DEFAULT, we continue with the default lock acquisition sequence 231.

Figure 3:
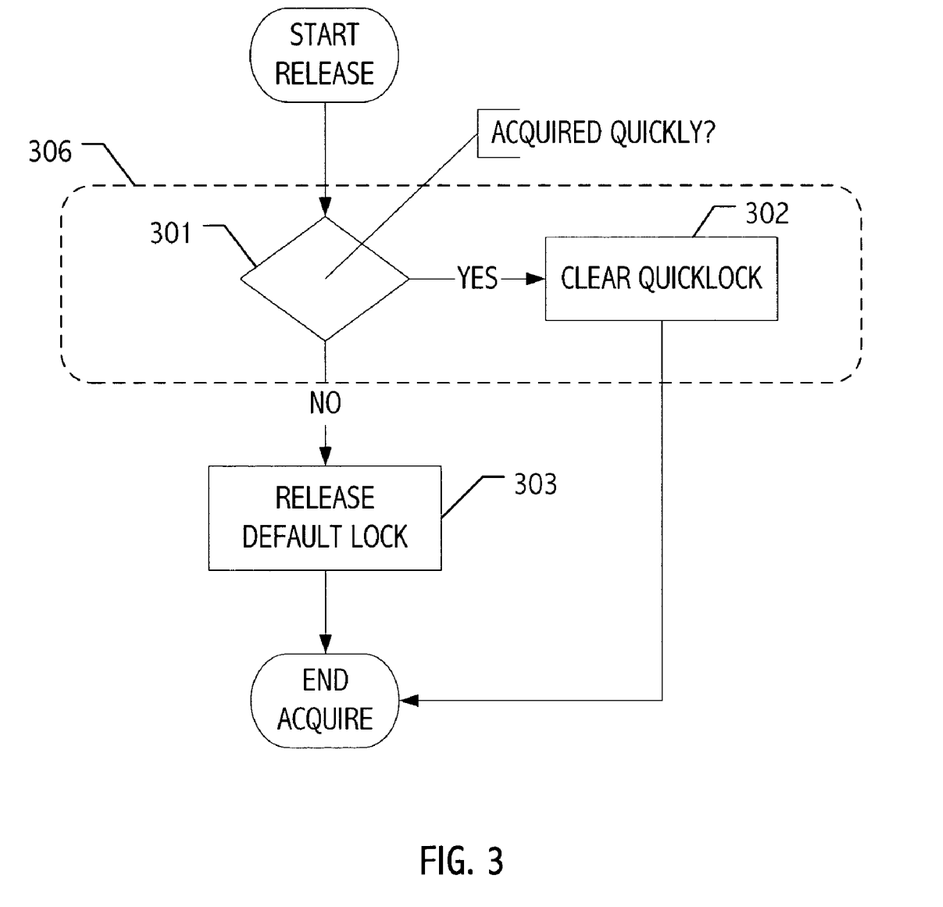
FIG. 3 depicts a release flow for a quickly reacquirable lock in accordance with some embodiments of the present invention.

FIG. 3 depicts a release flow for a quickly reacquirable lock in accordance with some embodiments of the present invention. Releasing a QRL is simple. If the thread acquired the QRL via the fast path (decision 301), the flow simply resets (302) the quicklock field. Otherwise, it executes (303) the default lock's release protocol. Again, note that no atomic read-modify write operations are employed in the ultra fast path 306.

Atomic-Free QRL Implementation Overview

Our goal is to avoid the use, in the ultra fast path, of expensive synchronization instructions such as atomic instructions and, to the extent possible, membar instructions. In a sequentially consistent multiprocessor, it is straightforward to design a technique in which a bias holder reacquires the lock by first writing its quicklock bit and then verifying that the lock has not been revoked; and revoking processes first indicate revocation and then check whether the bias holder has acquired the QRL. This technique is attractive because the ultra fast path includes only load-type and store-type memory access instructions. Unfortunately, however, such techniques are not typically correct in multiprocessors with memory models that are weaker than sequential consistency, and therefore a membar instruction may be needed to ensure correctness in some realizations. In some, though not all, realizations, a membar instruction may be employed in the ultra fast path, though at some significant cost.

Some realizations in accordance with the present invention employ a membar instruction to ensure proper order of a store that sets a quicklock bit and a load that verifies that bias has not been revoked. However, for our purposes, we do not require the full effects of a membar instruction in the biased acquire and release code paths. Rather, it would be sufficient to preclude a single read (of the lock status) from being reordered before a single write (of the quicklock). This lesser requirement allows us to consider techniques that exploit subtleties of certain implementations of the TSO memory model. Therefore, if we can introduce an artificial dependency between the write and read instructions mentioned above, we can ensure that they are not adversely reordered.

Our scheme for introducing this dependency is to collocate the status field and the quicklock field into the two halves of a 32-bit word. Then, we perform the following steps in order to reacquire the lock on the ultra fast path:

1. perform a half-word store on the quicklock field;
2. load the ENTIRE 32 bit word; and
3. shift out the status field from what we just read.

The illustrated scheme is suitable for implementations of the TSO memory model that ensure that the load in step 2 is not ordered before the store in step 1. Locks based on this technique, including both a generalized implementation and examples that use MCS and TATAS as the default lock are detailed below.

This collocation technique provides portability to those implementations of a memory model in which apparent program order is guaranteed for instructions executed on the same processor; further, it requires no operating system intervention. We note that some care must be used to ensure that a compiler does not optimize steps 2 and 3 into a half-word read, as this would once again allow the read to be reordered. Because behavior of some memory model implementations may not be in accordance with the assumptions made for the collocation technique, we also present alternative QRL designs, including QRLs that employ membar operations or that employ signal handler, cross-call or garbage collection safe-point techniques. These QRL designs are described in greater detail below, but will be generally understood with reference to the various collocation-based QRL implementations now described.

Generic Lock Implementation Employing Collocation

In this section, we provide a detailed description of our generic QRL lock, with reference to exemplary source code. A collocation based technique is employed although code for membar based and signal-based techniques are provided later in this description.

In general, QRL techniques will be understood with reference to the following definitions and data structures:

```
/* statuses for qrl locks */
#define BIASED(id) ((int)(id)<<2)
#define NEUTRAL 1
#define DEFAULT 2
#define REVOKED 3
#define ISBIASED(status) (0==((status) & 3))
/* word manipulation (big-endian versions shown here) */
#define MAKEDWORD(low, high)
    (((unsigned int) (low)<<16)|(high))
#define HIGHWORD(dword) ((unsigned short) dword)
#define LOWWORD(dword)
    ((unsigned short) (((unsigned int) (dword))>>16))

typedef volatile struct tag_qrlgeneric_lock {
    volatile union {
        volatile struct {
            volatile short quicklock;
            volatile short status;
        } h;
        volatile int data;
    } lockword;
    // *** PLUS WHATEVER FIELDS ARE
    // NEEDED FOR THE DEFAULT LOCK ***

} qrlgeneric_lock;
```

The MAKE DWORD, LOWWORD, and HIGHWORD macros are all configured for machines with a 32-bit big-endian memory hardware access scheme. Based on the description herein, persons of ordinary skill in the art will appreciate suitable macros for other platforms.

Turning first to a generic acquire sequence, the following code is illustrative:

```
int qrlgeneric_acquire (qrlgeneric_lock *L, int id) {
01      int status = L->lockword.h.status;
02
03      /* If the lock's mine,
            I can reenter by just setting a flag */
04      if (BIASED(id) == status)
05      {
06          L->lockword.h.quicklock = 1;
07          if (BIASED(id) == HIGHWORD(L->lockword.data))
08              return 1;
09          L->lockword.h.quicklock = 0;    // I didn't get the lock,
                                            // so be sure not to block
                                            // the process that did.
10          status = L->lockword.h.status;
11      }
12
13      if (DEFAULT != status)
14      {
15          /* If the lock is unowned, try to claim it */
16          if (NEUTRAL == status)
17          {
18              if (CAS(&L->lockword,                // By definition, if
19                  MAKEDWORD(0, NEUTRAL),           // we saw neutral,
20                  MAKEDWORD(1, BIASED(id))))       // the lock is
                                                     // unheld
```

-continued

```
21        {
22           return 1;
23        }
24        /* If I didn't bias the lock to me, someone else just
25           grabbed it. Fall through to the revocation code */
26        status = L->lockword.h.status; /* resample */
27     }
28
29     /* If someone else owns the lock, revoke them */
30     if (ISBIASED(status))
31     {
32        do
33        {
34           unsigned short biaslock = L->lockword.h.quicklock;
35           if (CAS(&L->lockword,
36                 MAKEDWORD(biaslock, status),
37                 MAKEDWORD(biaslock, REVOKED)))
38           {
39              /* I'm the revoker. Set up the default lock. */
40              /* *** INITIALIZE AND ACQUIRE THE
                    DEFAULT LOCK HERE *** */
41              /* Note: this is an uncontended acquire, so it */
42              /* can be done without use of atomics if this is */
43              /* desirable. */
44              L->lockword.h.status = DEFAULT;
45
46              /* Wait until quicklock is free */
47              while (LOWWORD(L->lockword.data))
48                 ;
49              return 0; /* And then it's mine */
50           }
51
52           // The CAS could have failed and we got here for
53           // either of two reasons. First, another process
54           // could have done the revoking; in this case we need
55           // to fall through to the default path once the other
56           // process is finished revoking. Secondly, the bias
57           // process could have acquired or released the
                 // biaslock field; in this case we need merely retry.
58           status = L->lockword.h.status;
59        }
60        while (ISBIASED(status));
61     }
62
63     // If I get here, the lock has been revoked by someone
64     // other than me. Wait until they're done revoking, then
65     // fall through to the default code.
66     while (DEFAULT != L->lockword.h.status)
67        ;
68  }
69
70  /* Regular default lock from here on */
71  assert(DEFAULT == L->lockword.h.status);
72  /* *** DO NORMAL (CONTENDED)
           DEFAULT LOCK ACQUIRE FUNCTION
           HERE *** */
73  return 0;
}
```

When a thread attempts to acquire the QRL, there are four distinct cases to consider, based on the value of the status word.

Case 1: The first case occurs when the lock has never been held (so the lock's status word is NEUTRAL). In this case, the thread verifies the lock state (lines 1, 13, 16) and attempts to install itself as the lock's bias holder via a CAS instruction (lines 18-20). A CAS is necessary here to prevent two or more threads from simultaneously biasing the lock to themselves. (Threads that fail this CAS fall through to the revocation code, described below as the third acquisition case.) We note that some thread is guaranteed to complete the CAS operation successfully. When a thread successfully installs itself as the bias holder, this step simultaneously changes the lock state from NEUTRAL to BIASED and implicitly grants the lock to the new bias holder (hence the "1" in the first part of the DWORD in line 20). Finally, the return of "1" (line 22) indicates that the lock was acquired via (and should thus be released via) the ultra fast path.

Case 2: The expected common case for QRL locks occurs when a bias holder thread attempts to reacquire the lock. This case is detected immediately by checking the lock status word (line 4). In this case, the process simply resets the quicklock flag (line 6), verifies that the lock hasn't been revoked (line 7), and signals acquisition of the lock via the ultra fast path (line 8). In the event that the lock has been revoked, the bias holder clears the quicklock flag and falls through to the default acquisition case (lines 9 and 70-73). Note that the collocation technique described above ensures that the resampling of the lock's status word (line 7) cannot be reordered above the write to the quicklock flag (line 6). This in turns ensures that if a bias holder attempts to reacquire the lock simultaneously with some other process attempting to revoke the lock, then either the revoker detects that the bias holder has reacquired the lock or the bias holder detects that the lock has been revoked. Thus, they do not both proceed to their critical sections.

While a collocation-based technique is illustrated, persons of ordinary skill in the art will recognize that an explicit membar operation may also be employed (e.g., between lines 6 and 7, above) to ensure the desired ordering of operations.

Case 3: The next acquisition case occurs the first time that a thread other than the bias holder attempts to acquire the lock, detected by the lock status field being biased to another thread. This case is detected in line 30, when the thread determines that the lock is currently biased, but not to itself Lines 34-37 set up and attempt a CAS operation to convert the lock from BIASED status to REVOKING. (REVOKING means that a thread is currently in the middle of revoking the lock.) This CAS is in a loop (lines 32, 60) because it could fail if the bias holder toggles the quicklock flag between lines 34 and 35. In any event, a fresh read of the status word is needed in this case; line 58 accomplishes this. Assuming that such a toggle eventually does not happen, the CAS ensures the existence of a unique revoking thread. Any other threads that were concurrently attempting to revoke the lock will note that the lock is no longer biased (line 60), and spin until the default lock is established by the revoker (lines 66-67). Finally, non-revokers fall through to the default acquisition path (lines 70-73). Meanwhile, the revoker thread initializes the default lock to an acquired state (line 40) and changes the lock status to DEFAULT. Initializing the default lock is uncontended, so may be done without using atomic instructions that might otherwise be needed. Next, the revoker waits until the former bias holder is not holding the quicklock (lines 47-48). Finally, because successfully revoking the bias holder implicitly grants the first non-quick acquisition of the lock, the revoker signals success via the default path (line 49).

Case 4: The final case occurs when the lock status is DEFAULT. From this point forward, lock acquisition consists of three steps. First, a thread fails the two tests for non-DEFAULT status on lines 13 and 30. Next, it acquires the default lock using whatever default protocol is desired (implied here by line 72; this should actually be replaced with appropriate code for the default lock). Finally, it signals success via the default path (line 73) by returning 0.

Releasing a QRL is quite simple and will be understood with reference to the following code:

```
void qrlgeneric_release(qrlgeneric_lock *L,
   int acquiredquickly) {
```

```
74  if (acquiredquickly)
75     L->lockword.h.quicklock=0;
76  else
77  {
78     /* *** DO NORMAL DEFAULT
       LOCK RELEASE FUNCTION HERE *** */
79  }
}
```

If the thread acquired the QRL via the fast path (line 74), the release sequence simply resets the quicklock (line 75). Otherwise, it executes the default lock's release protocol (lines 76-79).

In the preceding generic code, behavior and implementation of the default lock remains unspecified as selection thereof will, in general, be based on system- or application-specific considerations. Nonetheless, based on the description herein, persons of ordinary skill in the art will appreciate a variety of default lock implementations that may be employed in combination with the illustrated techniques. In the sections that follow, we detail two exemplary variations: a first providing an MCS default lock and a second providing a TATAS default lock.

MCS Lock Variation

Building on the preceding description, persons of ordinary skill in the art will appreciate variations for any of a variety of underlying default locks. A first variation for an MCS lock is detailed below. The implementation supports a queue of lock requests. Supporting data structures are defined (and initialized) as follows:

```
typedef struct tag_grlmcs_node {
    volatile struct tag_grlmcs_node *next;
    volatile int flag;
} grlmcs_node;

typedef volatile struct tag_grlmcs_lock {
    volatile union {
        volatile struct {
            volatile short quicklock;
            volatile short status;
        } h;
        volatile int data;
    } lockword;
    volatile grlmcs_node *defaultlock;
} grlmcs_lock;

void grlmcs_initialize(grlmcs_lock *L) {
    L->lockword.data=MAKEDWORD(0, NEUTRAL);
    L->defaultlock=NULL;
}
```

Acquisition is analogous to that illustrated above, with MCS lock specific details as follows:

```
int qrlmcs_acquire (qrlmcs_lock *L, qrlmcs_node *I, int Id) {
  int status = L->lockword.h.status;
  // If the lock's mine, I can reenter by just setting a flag
  if (BIASED(id) == status) {
    L->lockword.h.quicklock = 1;
    if (BIASED(id) == HIGHWORD(L->lockword.data))
      return 1;
    L->lockword.h.quicklock = 0;  /* I didn't get the lock,
                                     so be sure */
    status = L->lockword.h.status;
  } /* not to block the process that did */
  if (DEFAULT != status) {
    /* If the lock is unowned, try to claim it */
    if (NEUTRAL == status) {
      if (CAS(&L->lockword,                 // By definition, if
              MAKEDWORD(0, NEUTRAL),        // we saw neutral,
              MAKEDWORD(1, BIASED(id))))    // the lock is
                                            // unheld
      {
        return 1;
      }
      /* If I didn't bias the lock to me, someone else just
         grabbed it. Fall through to the revocation code */
      status L->lockword.h.status /* resample */
    }
    /* If someone else owns the lock, revoke them */
    if (ISBIASED(status)) {
      do {
        unsigned short biaslock = L->lockword.h.quicklock;
        if (CAS (&L->lockword,
                 MAKEDWORD(biaslock, status),
                 MAKEDWORD(biaslock, REVOKED))) {
          /* I'm the revoker. Claim the head of the queue. */
          I->next = NULL;
          L->defaultlock = I;
          L->lockword.h.status = DEFAULT;
          /* Wait until lock is free */
          while (LOWWORD(L->lockword.data))
            ;
          return 0; /* And then it's mine */
        }
        // The CAS could have failed and we got here for
        // either of two reasons. First, another process could
        // have done the revoking; in this case we need to
        // fall through to the default path once the other
        // process is finished revoking. Secondly, the bias
        // process could have acquired or released the
        // biaslock field; in this case we need merely retry.
        status = L->lockword.h.status;
      } while (ISBIASED(status));
    }
    // If I get here, the lock has been revoked by someone
    // other than me. Wait until they're done revoking, then
    // fall through to the default code.
    while (DEFAULT != L->lockword.h.status)
      ;
  }
  /* Regular MCS from here on */
  assert(DEFAULT == L->lockword.h.status);
  I->next = NULL;
  qrlmcs_node *pred = (qrlmcs_node *)SWAP(&L->defaultlock, I);
  if (NULL != pred) {
    I->flag = 1;
    pred->next = I;
    while (I->flag)
      ;
  }
  return 0;
}
```

Again an ultra fast path is free of atomic read-modify-write operations. As before, though the exemplary code builds on a collocation technique, an explicit membar can be added for implementations in which the assumptions underlying the collocation solution may be invalid.

Release is analogous and again free of atomic read-modify-write operations in the ultra fast path.

```
void qrlmcs_release (qrlmcs_lock *L, qrlmcs_node *I,
                    int acquiredquickly) {
```

-continued
```
        /* Releasing a quickly acquired lock is very easy */
        if (acquiredquickly) {
            L->lockword.h.quicklock = 0;
            return;
        }
        /* Otherwise, go through the MCS release procedure */
        if (NULL == I->next) {
            if (CAS(&L->defaultlock, I, NULL))
                return;
            while (NULL == I->next)
                ;
        }
        I->next->flag = 0;
    }
```

TATAS Lock Variation

A second variation for a TATAS lock is detailed below. Supporting data structures are defined (and initialized) as follows:

define QRL_BASE 50 /* Initial backoff value */ define QRL CAP 800 /* Maximum backoff value */ typedef struct tag_qrltas_lock {
   volatile union {
      struct {
         short quicklock;
         short status;
      } h;
      int data;
   } lockword;
   volatile long defaultlock;
} qrltas_lock;

void qrltas_initialize (qrltas_lock *L) {
   L->lockword.data=MAKEDWORD (0, NEUTRAL);
   L->defaultlock=0;
}

Acquisition is analogous to that illustrated above, with TATAS lock specific details as follows:

```
int qrltas_acquire(qrltas_lock *L, int Id) {
    int status = L->lockword.h.status;
    /* If the lock's mine, I can reenter by just setting a flag */
    if (BIASED(id) == status) {
        L->lockword.h.quicklock = 1;
        if (BIASED(id) == HIGHWORD(L->lockword.data))
            return 1;
        L->lockword.h.quicklock = 0;    // I didn't get the lock, so
                                        // make sure I don't block
                                        // up the process that did
        status = L->lockword.h.status;
    }
    if (DEFAULT != status) {
        /* If the lock is unowned, try to claim it */
        if (NEUTRAL == status) {
            if (CAS(&L->lockword,           // By definition, if
                    MAKEDWORD(0, NEUTRAL),  // we saw neutral,
                    MAKEDWORD(1, BIASED(id))))  // the lock is unheld
            {
                /* Biasing the lock counts as an acquisition */
                return 1;
            }
            // If I didn't bias the lock to me, someone else just
            // grabbed it. Fall through to the revocation code
            status = L->lockword.h.status; /* resample */
        }
        /* If someone else owns the lock, revoke them */
```

-continued
```
        if (ISBIASED(status)) {
            do {
                unsigned short biaslock = L->lockword.h.quicklock;
                if (CAS (&L->lockword,
                         MAKEDWORD(biaslock, status),
                         MAKEDWORD(biaslock, REVOKED))) {
                    /* I'm the revoker. Claim my lock. */
                    L->defaultlock = 1;
                    L->lockword.h.status = DEFAULT;
                    /* Wait until lock is free */
                    while (LOWWORD(L->lockword.data))
                        ;
                    return 0; /* And then it's mine */
                }
                // The CAS could have failed and we got here for
                // either of two reasons. First, another process could
                // have done the revoking; in this case we need to
                // fall through to the default path once the other
                // process is finished revoking. Secondly, the bias
                // process could have acquired or released the
                // biaslock field; in this case we need merely retry.
                status = L->lockword.h.status;
            }
            while (ISBIASED(status))
                ;
        }
        // If I get here, the lock has been revoked by someone
        // other than me. Wait until they're done revoking, then
        // fall through to the default code.
        while (DEFAULT != L->lockword.h.status)
            ;
    }
    /* Regular Tatas from here on */
    assert(DEFAULT == L->lockword.h.status);
    while (!CAS(&L->defaultlock, 0, 1))
        while (L->defaultlock)
            ;
    return 0;
}
```

As before, the ultra fast path is free of atomic read-modify-write operations. Also as before, though the exemplary code builds on a collocation technique, an explicit membar can be added for implementations in which the assumptions underlying the collocation solution may be invalid.

Release is analogous and again free of atomic read-modify-write operations in the ultra fast path.

```
void qrltas_release(qrltas_lock *L, int acquiredquickly) {
    if (acquiredquickly)
        L->lockword.h.quicklock=0;
    else
        L->defaultlock=0;
}
```

Other QRL Variations

Collocation and membar-based techniques have been described above with reference to generic, MCS and TATAS locks. However, other techniques may be employed for race condition avoidance. In particular, signal-handler-based, cross-call-based and garbage collection safe-point-based techniques as well as other membar based techniques are all envisioned and described below.

Our first alternative QRL uses signals during the revocation cycle. Specifically, a signal handler executed by the bias owner at the request of the revoking process can inspect the state of the QRL and switch it over to the default lock if the bias holder is not currently holding the lock. If the bias holder is currently holding the lock, the signal handler can set state such that the revoking process must wait until the bias holder releases its lock. Once this latter state is set, the bias holder cannot reacquire the QRL except via the default lock path.

Exemplary code for our signal-based lock follows. As a preliminary matter, constants and other relevant definitions are as follows:

```
typedef struct {
    struct _Thread * volatile Bias ;
    mutex_t SlowPathLock [1] ;
} BiasableMutex ;
typedef struct _Thread {
    int ThreadID ;           // Identity of thread - used for
                             // thr_kill( ) for signal
    lwp_mutex_t revLock ;    // revocation lock
    BiasableMutex * volatile revMux ;  // Mutex currently being
                                       // revoked
} Thread ;
// Bias encoding:
// 0|00 : Neutral (encoded as NULL)
// T|00 : Biased toward thread "T" - unlocked
// T|01 : Biased toward thread "T" - locked
// 0|10 : Slow
// *|11 : undefined - encoding not used
//
typedef enum {
    BNEUTRAL    = 0,
    BBIAS       = 1,
    BSLOW       = 2,
} BiasEncoding ;
#define INT(x) ((uintptr_t) (x))
```

Next, a suitable signal handler may be implemented as follows:

```
static
int revTrap (int signo, siginfo_t*si, ucontext_t*ctx) {
    uintptr_t*regv ; // Register set at the time of the signal
    uintptr_t ip, rs, b ;
    Thread*Self ;
    BiasableMutex * m ;
    MEMBAR(StoreLoad) ;
    // If the interrupted instruction pointer is within a critical
    // section then force the thread to restart critical section
    // when it unwinds from the signal handler.
    ip=regv[REG_PC];
    rs=csRestart (ip);
    if (rs !=0) {
        regv[REG_PC]=rs ;
        regv[REG nPC]=rs+4 ;
    }
    Self=CURRENTTHREAD( ) ;
    m=Self->revMux ;
    ASSERT (m && m->Bias==(Self|BBIAS)) ;
    // Switch to slow-path locking
    b=m->Bias ;
    if (b & BBIAS) {
        _lwp_mutex_trylock (m->SlowPathLock) ;
    }
    m->Bias=BSLOW ;
    Self->revMux=NULL ;
    return 0 ;
```

The signal handler, which is executed in the context of the bias-holding thread, waits for release of the quicklock before effectuating a bias revocation.

Finally, revoke, lock and unlock sequences may be implemented as follows. As before, ultra fast paths are free of atomic read-modify-write operations.

```
static
int    Revoke (Thread * t, BiasableMutex * m) {
    _lwp_mutex_lock (&t->revLock) ;
    if (m->Bias == BSLOW) {
        // Some other revoker thread completed revocation first.
        // This thread doesn't need to take any special action.
        _lwp_mutex_unlock (&t->revLock) ;
        return 0 ;
    }
    // Force the revokee to call revTrap( )
    t->revMux = m ;
    thr_kill (t->ThreadID, SIGUSR1) ;    // send signal to revokee
    while (t->revMux != NULL) ;          // wait for revokee to
                                         // acknowledge
    _lwp_mutex_unlock (&t->revLock) ;
    return 0 ;
}
int    ILock (BiasableMutex * m) {
    uintptr_t b ;
    Thread * Self ;
    // Ultra-fast-path . . .
    Self = CURRENTTHREAD( ) ;
    if (csCAS (&m->Bias, Self, INT(Self)|BBIAS) == Self) return 0 ;
Retry:
    b = m->Bias ;
    if (b == Self) {
        if (csCAS (&m->Bias, b, b|BBIAS) == b) { return 0 ; }
        goto Retry ;
    }
    if (b == BSLOW) { goto SlowPath ; }
    if (b == BNEUTRAL) { CAS (&m->Bias, b, Self) ; goto Retry ; }
    ASSERT (b != (INT(Self)|BBIAS)) ;
    Revoke ((INT(b) & ~BBIAS), m) ;
SlowPath:
    return _lwp_mutex_lock (m->SlowPathLock) ;
}
int    IUnlock (BiasableMutex * m) {
    Thread * Self ;
    uintptr_t b ;
    uintptr_t bs ;
    // Ultra-fast-path . . .
    Self = CURRENTTHREAD( ) ;
    bs = INT(Self)|BBIAS ;
    if (csCAS (&m->Bias, bs, Self) == bs) return 0 ;
Retry:
    b = m-->Bias ;
    if (b == (INT(Self)|BBIAS)) {
        if (csCAS (&m->Bias, b, Self) == b) {
            return 0 ;
        }
        goto Retry ;
    }
    ASSERT (b == BSLOW) ;    // Caveat: Asserts in place of proper
                             // error checking
    return _lwp_mutex_unlock (m->SlowPathLock) ;
}
```

Operation of the preceding exemplary code will be understood with reference to the following macro definitions and helper routines, which are illustrated in SPARC assembly but which may be easily adapted for other processors or execution environments.

```
#define FBEGIN(x)    .align 16; .global x; .type x ,#function ; x:
#define FEND(x)      .size x,. −x; .text
!! csCAS, csRestart: helper routines for ILock, IUnlock
             .text
             !! rslt = csCAS (Addr, Cmp, Set)
FBEGIN (csCAS)
.cb:    ld     [%o0], %o3
        cmp    %o3, %o1
        bne    1f
        nop
```

```
.ce: st      %o2, [%o0]
1:           retl
             mov       %o3, %o0
FEND(csCAS)
             !! return (ip > cb && ip <= ce) ? cb : NULL
FBEGIN (csRestart)
             set       .cb, %o2
             set       .ce, %o3
             cmp       %o0, %o2
             bleu      1f
             cmp       %o0, %o3
             bgu       1f
             nop
             retl
             mov       %o2, %o0
1:           retl
             mov       0, %o0
FEND (csRestart)
```

Note that the csCAS operation implements a non-atomic compare-and-swap.

A close relative to the signal-based alternative applies in a garbage-collected environment. Here, at stop-the-world garbage-collection time, all threads other than the garbage collector are paused. Alternatively, a single thread, namely the bias-holding thread, may be stopped at a safe point. In either case, by adding a special revocation handler to the garbage collection process, it becomes possible to effect the revocation directly without worrying about concurrency.

We have noted that an alternative QRL can be constructed in a manner similar to that illustrated above with respect to the generic, MCS and TATAS collocation-based implementations, but using membar instructions instead of the collocation technique. Such an approach could conceivably be preferable if the practical cost of a membar were to become sufficiently small (because it would be portable to more memory models); however, this is typically not the case in current hardware. Nonetheless, for completeness, we provide illustrative code for a membar-based QRL. A lock sequence is implemented as follows:

```
int qrl_membar_lock (UMux * m) {
    Thread * Self ;
    Thread * Bias ;
    Self = GetReflexiveSelf ( );
Top:
    Bias = m->Bias ;
    if (Bias == Self) {// ultra fast-path locking
       ASSERT (Self->InCrit == NULL) ;
       Self->InCrit = m ; // Enter inner critical section
       MEMBAR(StoreLoad) ; // store incrit, load bias
       if (m->Bias == Self) { // resample
          ASSERT (m->Owner == NULL); // error check/diagnostics
          m->Owner = Self ; // Take ownership of the mutex
          Self->InCrit = NULL ; // Exit inner critical section
          return 0 ; // Success
       }
       Self->InCrit = NULL ; // Exit inner critical section
       MEMBAR(StoreLoad) ;
       goto Top ;
    }
    if (Bias != DEFAULT)
       if (Bias == NULL) { // Neutral ?
          CAS (&m->Bias, NULL, Self);       // transition
                                            // neutral->biased
          goto Top ;
       } else {
          if (Bias == REVOKING)
             goto Top ; // spin
          // Contention: demote and revoke the oplock
          // 1st revoker performs the revocation
          // subsequent revokers spin until the 1st revoker.
          // completes Store bias, Load incrit
          if (CAS(&m->Bias, Bias, REVOKING) != Bias) {
             goto Top ;
          }
          MEMBAR(StoreLoad) ;
          while (Bias->InCrit == m) ; // spin while CS is occupied
          ASSERT (m->Bias == REVOKING) ;
          m->Bias = DEFAULT ; // transition biased->default
          goto Top ;
       }
    }
    ASSERT (Bias == DEFAULT) ;
    // ... default path ...
    // The ultra-fast path and the default path share
    // UMux.Owner.
    Acquire lock via CAS (&m->Owner, NULL, Self)
}
```

We note also that this implementation can be restructured to make the revoking process spin until the quicklock flag is cleared. An improvement of this form has already been incorporated into the collocation-based implementations described above.

A corresponding unlock sequence is implemented as follows:

```
int qrl_membar_unlock (UMux * m) {
    UThread * Self = GetReflexiveSelf ( );
Top:
    if (m->Bias == Self) {
       ASSERT (Self->InCrit == NULL) ;
       Self->InCrit = m ; // Enter inner critical section
       MEMBAR(StoreLoad) ; // Store incrit, load bias
       if (m->Bias == Self) { // resample
          m->Owner = NULL ; // Drop ownership of the lock
          Self->InCrit = NULL ; // Exit inner critical section
          return 0 ;
       }
       Self->InCrit = NULL ; // Exit inner critical section
       MEMBAR(StoreLoad) ;
       goto Top ;
    }
    // ... default path ...
    m->Owner = NULL ; // wakeup successors, etc.
}
```

As yet another alternative QRL, Solaris cross-calls can be used to generate memory barriers in a remote processor when a revoking process needs to coordinate with it. In this approach, instead of executing a membar for every acquire and release by the bias holder, only a single membar would be needed at revocation time. This is sufficient to achieve an atomic-free lock; however, it would be highly operating system specific and thus difficult to port to other platforms.

Construction of Re-Biasable Locks

QRL locks are optimized for a single-process repeated-acquisition data access pattern. However, another common pattern, migratory data access, would not get nearly as much benefit from a QRL lock. Nonetheless, a straightforward extension of the QRL concept can be used in order to support such access. Specifically, if we add the ability to rebias a QRL lock once contention dies down, this reversion will be sufficient.

Unlike the basic QRL scheme, rebiasing cannot easily be generalized to all underlying default lock types. This is because the absence of contention is more readily detected at release time for some locks, but at acquire time for others. For example, the best indication that contention has concluded in the MCS lock is if a lock holder has no successor in the lock queue, but the only place where contention can be detected in the TATAS lock is by counting the number of attempts required to CAS the lock to "held."

In the following subsections, we detail sample schemes for rebiasing QRL locks that use two different default locks. One skilled in the art could readily identify other options for creating rebiasable QRL locks; we provide these schemes to illustrate the concept.

Rebiasable QRL-MCS Lock Construction

To create a rebiasable QRL-MCS lock, the ideal place to perform the rebiasing is at release time. Here, the following code can be executed (where I is the current lock holder's MCS qnode and L is the QRL-MCS lock pointer) at the beginning of the default release path:

```
if (NULL == I->next && !I->flag) /* !I->flag: uncontended
                                    acquire */
{
    L->lockword = MAKEDWORD(REBIASING, 0);
    membar ( );
    if (NULL == I->next) { /* resample */
        L->lockword = MAKEDWORD(BIASED(id), 0);
        return;
    }
    L->lockword = MAKEDWORD(DEFAULT, 0);
}
//...remainder of release code follows here...
```

This change adds a state REBIASING which is used to mark the reversion from DE FAULT to BIASED in the same way that REVOKING marks the transition from BIASED to DEFAULT. The code itself uses the same general resampling technique to verify that the reversion of the lock completed before any other process got in line in the default lock; this prevents a race condition that might otherwise occur.

In addition to this modification, updates to the QRL-MCS acquisition code are required. These are very similar to the code that pauses processes during the window while the lock is being revoked; therefore, we do not present them here.

Rebiasable QRL-TATAS Lock Construction

To create a rebiasable QRL-TATAS lock, two modifications to the basic scheme suffice. First, if a process is able to acquire the TATAS default lock on its first attempt, then this is an indication that either the process "got lucky" or that contention is low. (Conversely, if the process is not able to acquire the TATAS lock on its first CAS, this definitely means that contention remains.) So, a counter can be added to the lock that is only modified when a process holds the TATAS default lock. Initialized to some constant tuned to the application for which the lock is used, this counter is reset each time a process acquires the TATAS default lock under contention, and decremented each time a process acquires the TATAS default lock on its first attempt. If the counter ever hits zero, the current default lock holder simply needs to overwrite the QRL lock fields with a tuple indicating that the lock is biased to and currently acquired by the current lock holder. Effectively, then, the lock holder is switching to holding the QRL lock from the default TATAS lock.

A second needed modification is to add a check to the default lock acquisition path to test for reversion of the lock. When this is detected, a process simply retries the entire lock acquisition from the beginning of the acquire function.

Recap and Other Embodiments

We have presented QRL locks, a new class of mutual exclusion algorithms that are heavily optimized for a very common data access pattern in which a single process repeatedly and solely acquires a lock. Because they can be generalized to use any mutual exclusion algorithm with a standard interface, as well as many algorithms that do not use a standard interface, QRL locks can obtain the benefits of any properties of such locks for the uncontended case at the expense of a mere handful of non-atomic instructions in their critical path. QRL locks are optimized for a single-process repeated-acquisition data access pattern; however, we have also demonstrated rebiasable QRLs that can be used with migratory data access patterns.

While the invention(s) is (are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described, applications to other shared objects and other implementations will also be appreciated by persons of ordinary skill in the art. While much of description herein has focused on compare and swap (CAS) based synchronization, other synchronization primitives may be employed. For example, based on the description herein, persons of ordinary skill in the art will appreciate that other suitable constructs, including load-linked and store-conditional operation pairs (LL/SC) may be employed, as well. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computer readable storage medium storing program instructions executable by a processor of a multithreaded system to implement a mutual exclusion mechanism comprising:
    a biasable lock that is concurrently accessible to a plurality of threads on the multithreaded system and is biased to at most one of the plurality of threads at a given time, wherein the biasable lock includes a quick-lock field;

acquisition and release sequences that, when executed by a bias-holding thread on the processor, wherein the biasable lock is biased to the bias-holding thread, are free of atomic read-modify-write operations and wherein the acquisition sequence comprises:
  storing a value in the quick-lock field, the value indicating that the biasable lock is held by the bias-holding thread; and
  subsequent to said storing, determining whether the biasable lock is still biased to the bias-holding thread, wherein the acquisition sequence completes successfully and free of atomic read-modify-write operations if the biasable lock is determined to still be biased to the bias-holding thread.

2. The computer readable storage medium of claim 1, wherein the acquisition and release sequences include only read and write operations when executed by the bias-holding thread.

3. The computer readable storage medium of claim 1, wherein the biasable lock is initially unbiased.

4. The computer readable storage medium of claim 1, wherein the biasable lock is biased on creation.

5. The computer readable storage medium of claim 1, wherein the biasable lock is biased on acquisition.

6. The computer readable storage medium of claim 1, wherein the bias-holding thread is not the thread that created the lock.

7. The computer readable storage medium of claim 1, wherein execution of the acquisition sequence by the bias-holding thread employs a programming construct that precludes reordering of a particular read before a particular write.

8. The computer readable storage medium of claim 7, wherein the precluded reordering includes reordering by a compiler.

9. The computer readable storage medium of claim 7, wherein the precluded reordering includes reordering by the processor.

10. The computer readable storage medium of claim 7, wherein the programming construct employs collocation of the target of the particular read and the target of the particular write.

11. The computer readable storage medium of claim 7,
  wherein the particular read loads a lock status as part of said determining whether the biasable lock is still biased to the bias-holding thread; and
  wherein the particular write stores the value in the quick-lock field.

12. The computer readable storage medium of claim 7, wherein the preclusion is based, at least in part, on characteristics of an implementation of a memory model implemented by the processor.

13. The computer readable storage medium of claim 1,
  the processor implements a total store order (TSO) memory model,
  wherein the acquisition by the bias-holding lock includes a store operation followed in program order by a load operation, the store and load operations having collocated targets that encode a quick lock indication and lock status, respectively.

14. The computer readable storage medium of claim 1, wherein the biasable lock includes an MCS lock augmented to provide fast path acquisition and release sequences for the bias-holding thread.

15. The computer readable storage medium of claim 1, wherein the biasable lock includes an TATAS lock augmented to provide fast path acquisition and release sequences for the bias-holding thread.

16. The computer readable storage medium of claim 1, wherein the biasable lock includes a lock provided by a POSIX pthreads mutex library, augmented to provide fast path acquisition and release sequences for the bias-holding thread.

17. The computer readable storage medium of claim 1, wherein the biasable lock includes a monitor provided by a Java virtual machine implementation, the monitor augmented to provide fast path acquisition and release sequences for the bias-holding thread.

18. The computer readable storage medium of claim 1, wherein the biasable lock is rebiasable to another thread during course of a computation that employs the lock.

19. The computer readable storage medium of claim 18, wherein the program instructions are further executable to implement:
  detecting a current level of contention; and
  a rebiasing sequence executable by the processor to rebias the lock to the thread in response to detecting a lower level of contention.

20. The computer readable storage medium of claim 19, wherein the detecting a current level of contention detection comprises accessing a request queue to identify the level of contention.

21. The computer readable storage medium of claim 19, wherein the detecting a current level of contention detection comprises employing an attempt counter to identify the level of contention.

22. The computer readable storage medium of claim 1, wherein bias of the lock to the bias-holding thread is revocable and revocation of bias by, or on behalf of, a contending thread, is mediated, at least in part, using a signal handler.

23. The computer readable storage medium of claim 1, wherein bias of the lock to the bias-holding thread is revocable and revocation of bias by, or on behalf of, a contending thread, is mediated, at least in part, using a cross-call.

24. The computer readable storage medium of claim 1, wherein bias of the lock to the bias-holding thread is revocable and revocation of bias by, or on behalf of, a contending thread, is handled, at least in part, at a garbage collection safe point.

25. A computer readable storage medium storing program instructions executable by a processor of a multithreaded system to implement:
  a biasable lock is concurrently accessible to a plurality of threads on the multithreaded system and is biased to at most one of the plurality of threads at a given time, wherein the biasable lock includes a quick-lock field;
  at least two acquisition sequences, provided by the biasable lock, including a fast path acquisition sequence for a bias-holding thread to which the biasable lock has been biased and a second acquisition sequence, the fast path acquisition sequence optimized relative to the second acquisition sequence;
  wherein the fast path acquisition sequence is free of atomic read-modify-write operations and comprises:
    storing a value in the quick-lock field, the value indicating that the biasable lock is held by the bias-holding thread; and
    subsequent to said storing, determining whether the biasable lock is still biased to the bias-holding thread, wherein the acquisition sequence completes successfully and free of atomic read-modify-write operations if the biasable lock is determined to still be biased to the bias-holding thread.

26. The computer readable storage medium of claim 25, wherein the second acquisition sequence implements one of an MCS lock, a TATAS lock, a lock consistent with that provided by a POSIX pthread Mutex library and a Java monitor.

27. The computer readable storage medium of claim 25, wherein the biasable lock is rebiasable.

28. A computer-implemented method, the method comprising:
 instantiating a biasable lock that is concurrently accessible to a plurality of threads on the multithreaded system and is biased to at most one of the plurality of threads at a given time, wherein the biasable lock includes a quick-lock field; and
 for the thread to which bias has been directed, releasing and acquiring the biasable lock using fast path instruction sequences that are free of atomic read-modify-write operations wherein the acquisition sequence comprises:
  storing a value in the quick-lock field, the value indicating that the biasable lock is held by the bias-holding thread; and
  subsequent to said storing, determining whether the biasable lock is still biased to the bias-holding thread, wherein the acquisition sequence completes successfully and free of atomic read-modify-write operations if the biasable lock is determined to still be biased to the bias-holding thread.

29. The method of claim 28, further comprising: directing the bias to the thread coincident with a first acquisition of the biasable lock.

30. The method of claim 28, further comprising: directing the bias to the thread coincident with the instantiation.

31. The method of claim 28, further comprising: directing the bias to the thread coincident with creation of an object.

32. The method of claim 28, wherein directing of bias to the thread is performed by another thread.

33. The method of claim 28, further comprising: for a thread other than the thread to which bias has been directed, acquiring the lock using an instruction sequence that unbiases the lock, if it is biased.

34. The method of claim 28, further comprising: rebiasing the biasable lock to another thread.

35. The method of claim 28, further comprising: executing the program code as a multi-threaded software application configured to utilize the biasable lock to allow the bias-holding thread of the multi-threaded software application to repeatedly acquire and release the biasable lock, at least in part by executing one or more of the fast path instruction sequences.

36. The method of claim 35, further comprising: after rebiasing to another thread, allowing the another thread to repeatedly acquire and release the lock without executing any atomic operations with extremely low overhead.

37. The method of claim 28, wherein the method is performed as part of executing program code in a single-threaded execution environment,
 wherein the program code is compiled with the biasable lock for execution on both the single-threaded execution environment and on a multi-threaded execution environment, and
 wherein the biasable lock allows the program code to run in the single-threaded execution environment without significant lock-related overhead.

38. A computer readable storage medium storing program instructions executable by a processor of a multithreaded system to implement:
 a biasable software lock that is concurrently accessible to a plurality of threads on the multithreaded system and is biased to at most one of the plurality of threads at a given time and maintains both a lock state indicated by a value of a quick-lock field and a bias state, whereby acquisition of the lock by a thread to which bias has been directed is more efficient than acquisition of the lock by another thread and does not include any atomic read-modify-write operations and comprises:
  storing a value in the quick-lock field, the value indicating that the biasable software lock is held by the thread to which bias has been directed; and
  subsequent to said storing, determining whether bias is still directed to the thread, wherein the acquisition completes successfully and free of atomic read-modify-write operations if the bias is still directed to the thread.

39. The computer readable storage medium of claim 38, wherein the lock is rebiasable to another thread during course of a computation that employs the lock.

40. The computer readable storage medium of claim 38, including acquisition and release sequences that, when executed by the thread to which bias has been directed, include only read and write operations.

41. The computer readable storage medium of claim 40, wherein the acquisition sequence employs a programming construct that precludes reordering of a particular read before a particular write.

42. A computer readable storage medium storing program instructions executable by one or more processors of a multithreaded system to implement a program product including a mutual exclusion mechanism embodied therein, the program product comprising:
 a data structure instantiable in memory of a processor to implement a lock that includes a bias attribute, wherein the lock is concurrently accessible to a plurality of threads on the multithreaded system and is biased to at most one of the plurality of threads at a given time, wherein the biasable lock includes a quick-lock field;
 a lock acquisition sequence of operations executable by the processor, the lock acquisition sequence having a fast path for a thread to which bias has been directed and a second path, the fast path optimized relative to the second path;
 wherein the fast path acquisition sequence is free of atomic read-modify-write operations and comprises:
  storing a value in the quick-lock field, the value indicating that the lock is held by the thread to which bias has been directed; and
  subsequent to said storing, determining whether bias is still directed to the thread, wherein the acquisition completes successfully and free of atomic read-modify-write operations if the bias is still directed to the thread.

43. The computer readable storage medium of claim 42, further comprising: a lock release sequence of operations executable by the processor, the lock release sequence having a fast path for the thread to which bias has been directed and a second path, the fast path optimized relative to the second path.

44. The computer readable storage medium of claim 42, wherein the acquisition sequence employs a programming construct that precludes reordering of a particular read before a particular write.

45. The computer readable storage medium of claim 42, wherein the lock is rebiasable to another thread during course of a computation that employs the lock.

46. A computer implemented method, comprising:
performing by a computer processor:
  biasing a lock to a first thread of execution, wherein the biasable lock is concurrently accessible to a plurality of threads and is biased to at most one of the plurality of threads at a given time, wherein the biasable lock includes a quick-lock field; and
  subsequently acquiring the lock for, or by, the first thread with computational overhead less than for a second thread to which the lock is not currently biased, wherein said acquiring is performed free of atomic read-modify-write operations and comprises:
    storing a value in the quick-lock field, the value indicating that the lock is held by the first thread; and
    subsequent to said storing, determining whether the lock is still biased to the first thread, wherein said acquiring completes successfully with computational overhead less than for the second thread, if the lock is determined to still be biased to the first thread.

47. The computer implemented method of claim 46, further comprising: rebiasing the lock to a third thread of execution.

48. A computer system, comprising:
a processor coupled to one or more other processors;
a memory coupled to the processor, the memory storing program instructions executable by the processor to implement:
  a biasable lock that is concurrently accessible to a plurality of threads on the multithreaded system and is biased to at most one of the plurality of threads at a given time;
  acquisition and release sequences that, when executed by a bias-holding thread on the processor, wherein the biasable lock is biased to the bias-holding thread, do not comprise executing atomic read-modify-write operations and wherein the acquisition sequence comprises:
    storing a value in the quick-lock field, the value indicating that the biasable lock is held by the bias-holding thread; and
    subsequent to said storing, determining whether the biasable lock is still biased to the bias-holding thread, wherein the acquisition sequence completes successfully and free of atomic read-modify-write operations if the biasable lock is determined to still be biased to the bias-holding thread.

49. The computer system of claim 48, further comprising: a rebiasing sequence, executable by the processor to bias the biasable lock to another thread on the system instead of to the bias-holding thread.

50. The computer system of claim 48, wherein the memory is implemented as at least one computer readable storage medium selected from the set of a disk, tape or other magnetic, optical, or electronic storage medium.

51. A computer implemented method of making a single computer program product suitable for efficient execution as both a single-threaded computation and a multi-threaded computation on one or more processors, the method comprising:
  structuring a computation as a multithread computation;
  mediating at least some sources of contention in the multithreaded computation using a biasable locking mechanism, wherein the biasable locking mechanism is concurrently accessible to a plurality of threads on the one or more processors and is biased to at most one of the plurality of threads at a given time, wherein the biasable locking mechanism includes a quick-lock field;
  wherein said mediating includes providing at least two acquisition sequences including a fast path acquisition sequence for a bias-holding thread to which the biasable lock has been biased and a second acquisition sequence, the fast path acquisition sequence being optimized relative to the second acquisition sequence, wherein the fast path acquisition sequence comprises:
    storing a value in the quick-lock field, the value indicating that the biasable locking mechanism is held by the bias-holding thread; and
    subsequent to said storing, determining whether the biasable locking mechanism is still biased to the bias-holding thread, wherein the fast path acquisition sequence completes successfully and free of atomic read-modify-write operations if the biasable locking mechanism is determined to still be biased to the bias-holding thread;
  introducing the instances of the biasable locking mechanism into program code;
  compiling the program code; and
  encoding the compiled program code, including the instances of the biasable locking mechanism, in a computer program product.

52. The method of claim 51, wherein the encoding includes transferring the compiled program code onto at least one computer readable storage medium selected from the set of a disk, tape or other magnetic, optical, or electronic storage medium.

* * * * *

UNITED STATES PATENT AND TRADEMARK OFFICE
CERTIFICATE OF CORRECTION

| | |
|---|---|
| PATENT NO. | : 7,814,488 B1 |
| APPLICATION NO. | : 10/669948 |
| DATED | : October 12, 2010 |
| INVENTOR(S) | : David Dice et al. |

It is certified that error appears in the above-identified patent and that said Letters Patent is hereby corrected as shown below:

In the Claims:

Claim 36, col. 25, line 57, after "atomic operations", please delete "with extremely low overhead".

Signed and Sealed this

Twenty-first Day of December, 2010

David J. Kappos
*Director of the United States Patent and Trademark Office*